US012641644B2

(12) United States Patent
Seok et al.

(10) Patent No.: US 12,641,644 B2
(45) Date of Patent: May 26, 2026

(54) EHT UHR DYNAMIC MULTI-LINK SWITCHING IN WIRELESS COMMUNICATIONS

(71) Applicant: MediaTek Inc., Hsinchu City (TW)

(72) Inventors: Yongho Seok, San Jose, CA (US); James Chih-Shi Yee, San Jose, CA (US)

(73) Assignee: MediaTek Inc., Hsinchu City (TW)

( * ) Notice: Subject to any disclaimer, the term of this patent is extended or adjusted under 35 U.S.C. 154(b) by 342 days.

(21) Appl. No.: 18/235,005

(22) Filed: Aug. 17, 2023

(65) Prior Publication Data

US 2024/0064809 A1     Feb. 22, 2024

Related U.S. Application Data

(60) Provisional application No. 63/371,881, filed on Aug. 19, 2022.

(51) Int. Cl.
 *H04W 74/08*        (2024.01)
 *H04W 74/0816*     (2024.01)
(52) U.S. Cl.
 CPC ............................... *H04W 74/0816* (2013.01)
(58) Field of Classification Search
 CPC .. H04W 74/0816; H04W 84/12; H04W 76/15
 See application file for complete search history.

(56) References Cited

U.S. PATENT DOCUMENTS

| | | | |
|---|---|---|---|
| 2019/0158413 A1 | 5/2019 | Patil et al. | |
| 2020/0413465 A1* | 12/2020 | Park | H04W 76/15 |
| 2021/0212118 A1* | 7/2021 | Lu | H04W 74/0816 |
| 2023/0232452 A1 | 7/2023 | Li et al. | |

FOREIGN PATENT DOCUMENTS

WO     WO 2022057901 A1     3/2022

OTHER PUBLICATIONS

European Patent Office, Extended European Search Report in European Patent Application No. 23192138.8, Jan. 3, 2024.

* cited by examiner

*Primary Examiner* — Walli Z Butt
(74) *Attorney, Agent, or Firm* — Andy M. Han; Han IP PLLC

(57)         ABSTRACT

Various techniques and schemes pertaining to extremely-high throughput (EHT) ultra-high reliability (UHR) dynamic multi-link switching in wireless communications are described. A first access point (AP) affiliated with a first AP multi-link device (MLD) switches from operating on a first link to operating on a second link in a multi-link operation responsive to detecting the first link as busy. Then, the first AP transmits data to a first station (STA) affiliated with a first STA MLD during a transmission opportunity (TXOP) on the second link. The AP switches back to operating on the first link upon expiry of a period during which the first link is busy.

5 Claims, 8 Drawing Sheets

700

SWITCH, BY A FIRST ACCESS POINT (AP) AFFILIATED WITH A FIRST AP MULTI-LINK DEVICE (MLD), FROM OPERATING ON A FIRST LINK TO OPERATING ON A SECOND LINK IN A MULTI-LINK OPERATION RESPONSIVE TO DETECTING THE FIRST LINK AS BUSY

710

TRANSMIT, BY THE FIRST AP, DATA TO A FIRST STATION (STA) AFFILIATED WITH A FIRST STA MLD DURING A TRANSMISSION OPPORTUNITY (TXOP) ON THE SECOND LINK

720

SWITCH, BY THE FIRST AP, BACK TO OPERATING ON THE FIRST LINK UPON EXPIRY OF A PERIOD DURING WHICH THE FIRST LINK IS BUSY

730

Figure 7:
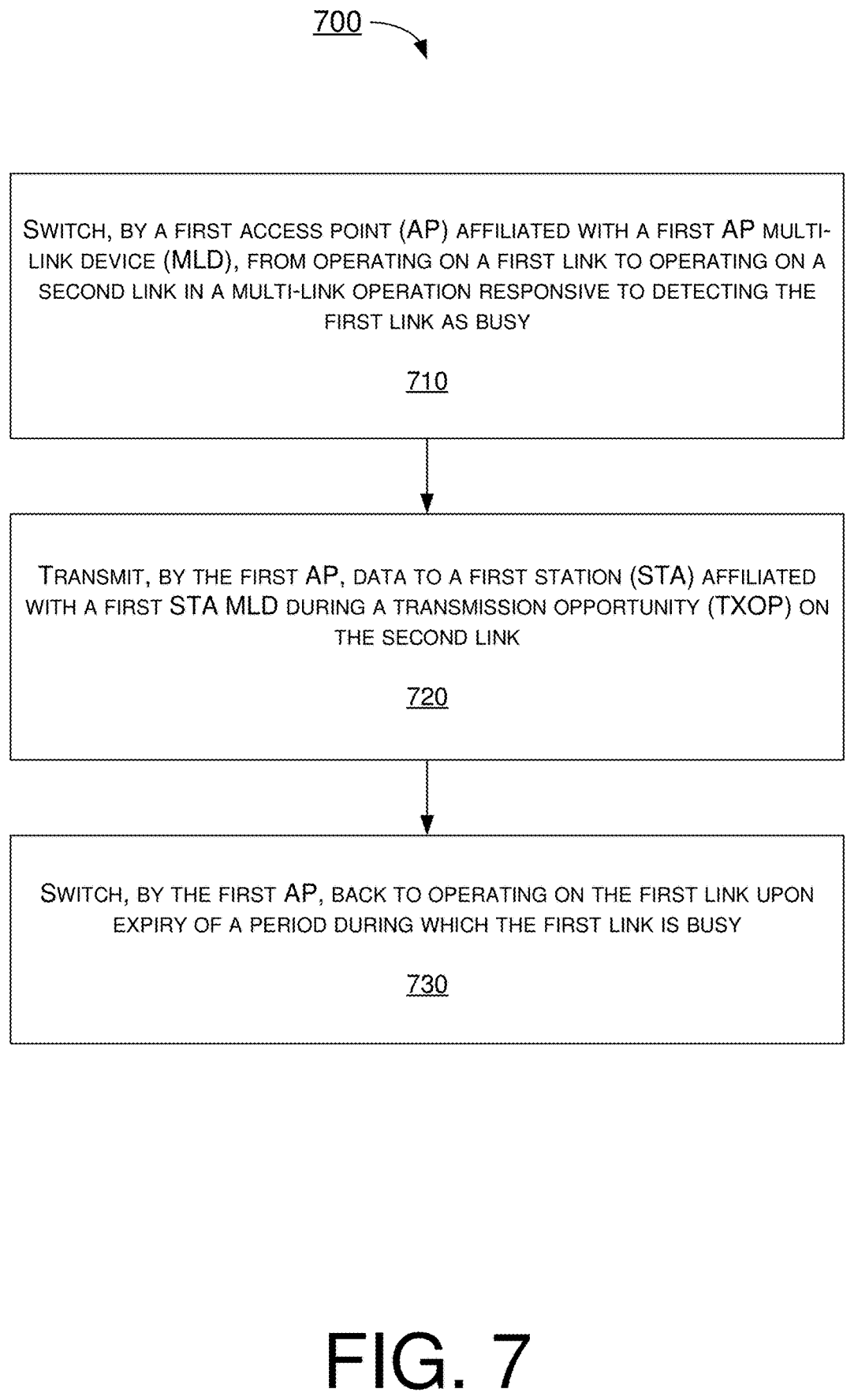

700

SWITCH, BY A FIRST ACCESS POINT (AP) AFFILIATED WITH A FIRST AP MULTI-LINK DEVICE (MLD), FROM OPERATING ON A FIRST LINK TO OPERATING ON A SECOND LINK IN A MULTI-LINK OPERATION RESPONSIVE TO DETECTING THE FIRST LINK AS BUSY

710

TRANSMIT, BY THE FIRST AP, DATA TO A FIRST STATION (STA) AFFILIATED WITH A FIRST STA MLD DURING A TRANSMISSION OPPORTUNITY (TXOP) ON THE SECOND LINK

720

SWITCH, BY THE FIRST AP, BACK TO OPERATING ON THE FIRST LINK UPON EXPIRY OF A PERIOD DURING WHICH THE FIRST LINK IS BUSY

Figure 8:
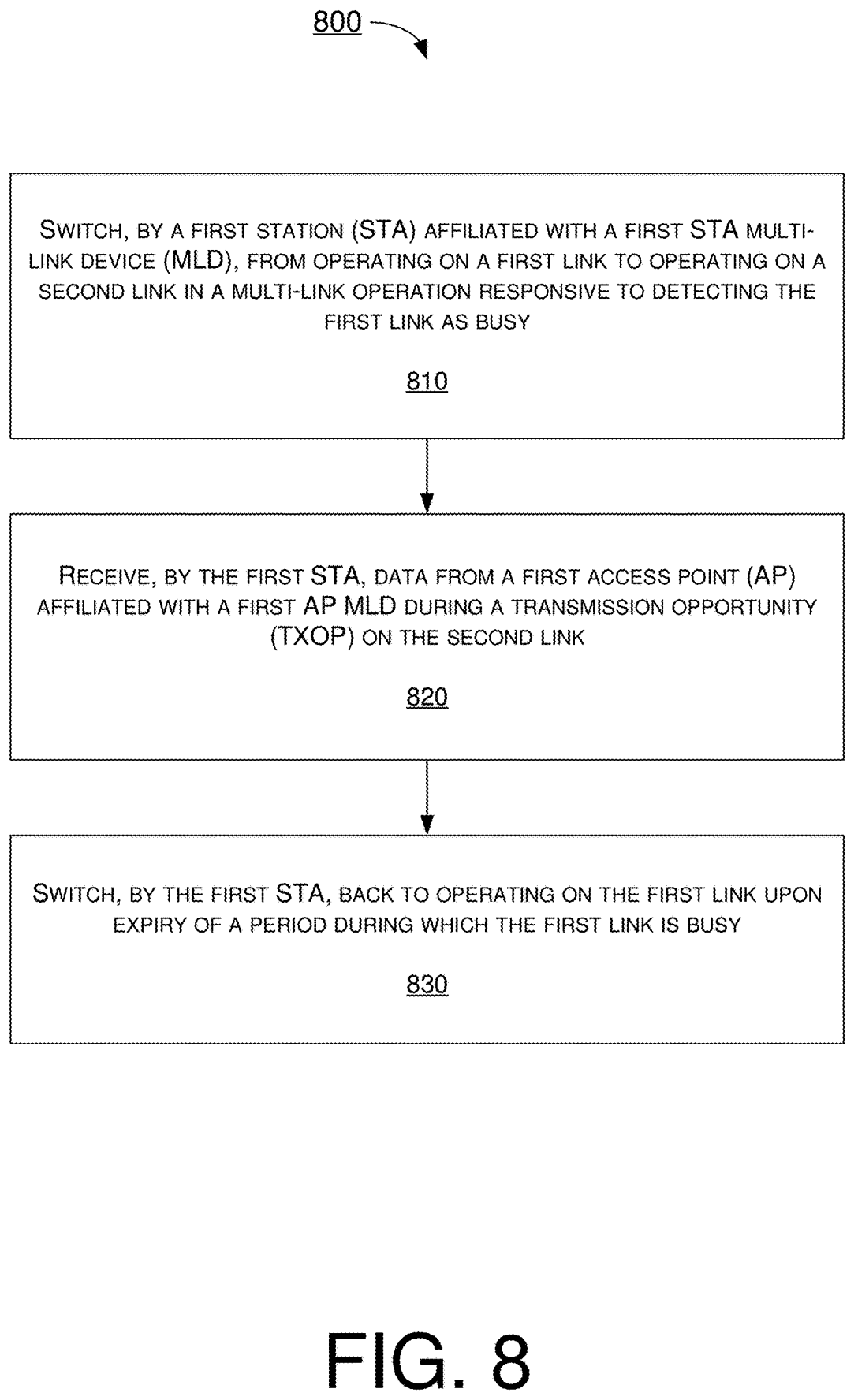

SWITCH, BY A FIRST STATION (STA) AFFILIATED WITH A FIRST STA MULTI-LINK DEVICE (MLD), FROM OPERATING ON A FIRST LINK TO OPERATING ON A SECOND LINK IN A MULTI-LINK OPERATION RESPONSIVE TO DETECTING THE FIRST LINK AS BUSY

810

RECEIVE, BY THE FIRST STA, DATA FROM A FIRST ACCESS POINT (AP) AFFILIATED WITH A FIRST AP MLD DURING A TRANSMISSION OPPORTUNITY (TXOP) ON THE SECOND LINK

820

SWITCH, BY THE FIRST STA, BACK TO OPERATING ON THE FIRST LINK UPON EXPIRY OF A PERIOD DURING WHICH THE FIRST LINK IS BUSY

EHT UHR DYNAMIC MULTI-LINK SWITCHING IN WIRELESS COMMUNICATIONS

CROSS REFERENCE TO RELATED PATENT APPLICATION(S)

The present disclosure is part of a non-provisional patent application claiming the priority benefit of U.S. Provisional Patent Application No. 63/371,881, filed 19 Aug. 2022, the content of which being herein incorporated by reference in its entirety.

TECHNICAL FIELD

The present disclosure is generally related to wireless communications and, more particularly, to extremely-high throughput (EHT) ultra-high reliability (UHR) dynamic multi-link switching in wireless communications.

BACKGROUND

Unless otherwise indicated herein, approaches described in this section are not prior art to the claims listed below and are not admitted as prior art by inclusion in this section.

In a wireless local area network (WLAN) according to current Institute of Electrical and Electronics Engineers (IEEE) 802.11 specifications, aggregated physical-layer protocol data units (A-PPDUs) may be utilized in wireless communications. An A-PPDU is comprised of multiple sub-PPDUs, with each sub-PPDU occupying respective non-overlapping frequency segment(s) and being applicable for downlink (DL) and uplink (UL) transmissions. The sub-PPDUs are orthogonal in frequency domain symbol-to-symbol. The sub-PPDUs can have the same PPDU format or different PPDU formats. However, for multi-link operations, how to utilize A-PPDUs and/or sub-PPDU(s) of an A-PPDU on multiple links and dynamically switching the utilization of A-PPDUs between different links, especially for EHT UHR communications, has yet to be defined at present time. Therefore, there is a need for a solution of EHT UHR dynamic multi-link switching in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to EHT UHR dynamic multi-link switching in wireless communications. It is believed that, under various proposed schemes in accordance with the present disclosure, issue(s) described herein may be addressed.

In one aspect, a method may involve a first access point (AP) affiliated with a first AP multi-link device (MLD) switching from operating on a first link to operating on a second link in a multi-link operation responsive to detecting the first link as busy. The method may also involve the first AP transmitting data to a first station (STA) affiliated with a first STA MLD during a transmission opportunity (TXOP)

on the second link. The method may further involve the first AP switching back to operating on the first link upon expiry of a period during which the first link is busy.

In another aspect, a method may involve a first STA affiliated with a first STA MLD switching from operating on a first link to operating on a second link in a multi-link operation responsive to detecting the first link as busy. The method may also involve the first STA receiving data from a first AP affiliated with a first AP MLD during a TXOP on the second link. The method may further involve the first STA switching back to operating on the first link upon expiry of a period during which the first link is busy.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 7 is a flowchart of an example process in accordance with an implementation of the present disclosure.

FIG. 8 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to EHT UHR dynamic multi-link switching in wireless communications. According to the present disclosure, a number of possible solutions may be implemented separately or jointly. That is, although these possible solutions may be described below separately, two or more of these possible solutions may be implemented in one combination or another.

Figure 1:
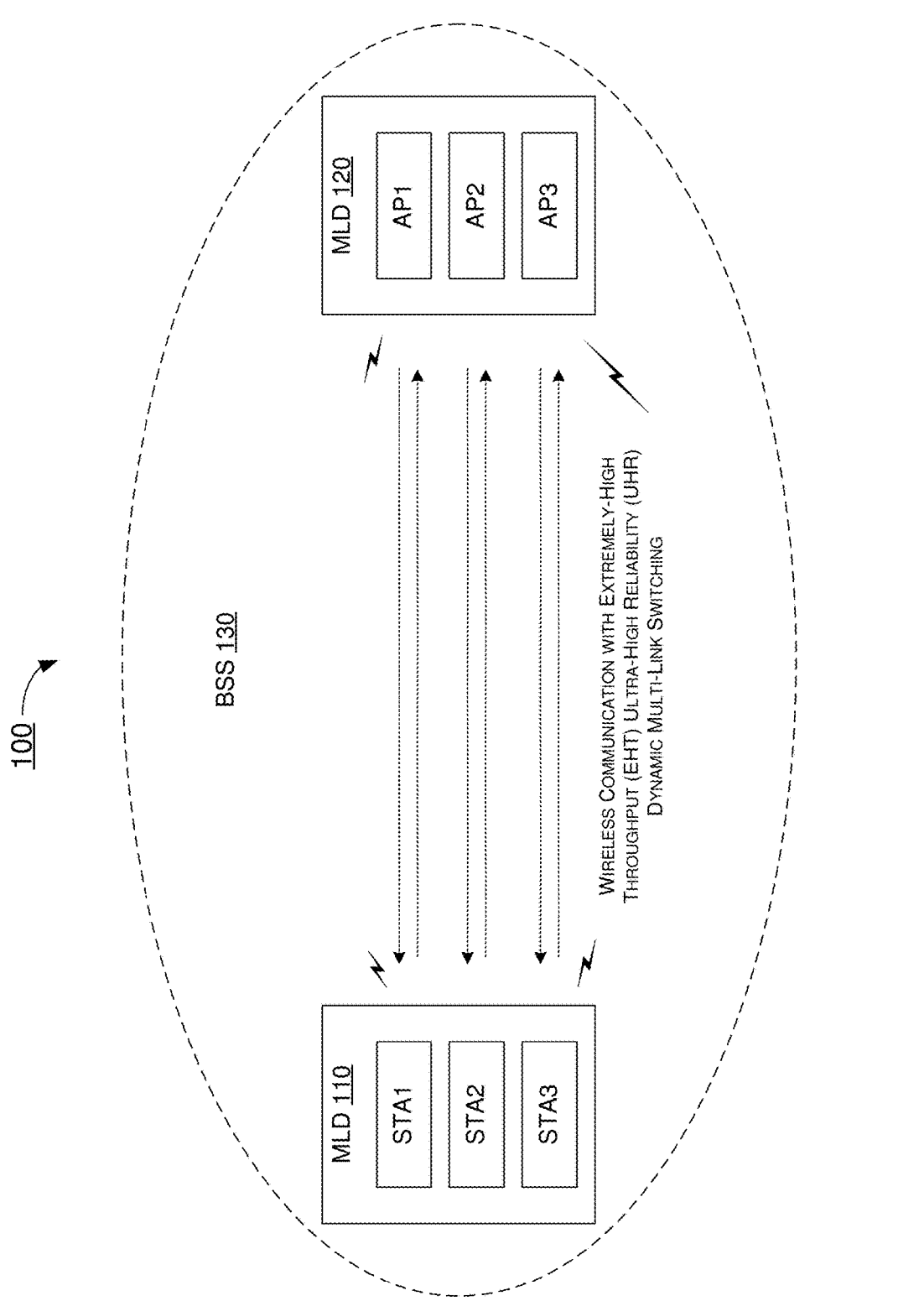
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 8 illustrate examples of implementation of various proposed schemes in network environment 100 in accordance with the present disclosure. The following description of various proposed schemes is provided with reference to FIG. 1~FIG. 8.

Referring to FIG. 1, network environment 100 may involve at least a first MLD, or MLD 110, and a second MLD, or MLD 120, communicating wirelessly with each other in a basic service set (BSS) 130 in accordance with one or more IEEE 802.11 standards (e.g., IEEE 802.11 be and beyond). Each STA of multiple STAs affiliated with MLD 110 may function as a non-AP STA, and each STA of multiple STAs affiliated with MLD 120 may function as an AP STA. That is, in the example shown in FIG. 1, MLD 110 may be non-AP MLD (herein interchangeably referred to as "STA MLD") and MLD 120 may be an AP MLD (although each of MLD 110 and MLD 120 may be an AP MLD or a STA MLD in various implementations). For simplicity and illustrative purposes without limiting the scope of the present disclosure, in FIG. 1, MLD 110 is shown to have three STAs ("STA1", "STA2" and "STA3" affiliated therewith) and MLD 120 is shown to have three APs ("AP1", "AP2" and "AP3" affiliated therewith), although in actual implementations the number of affiliated STAs/APs may be the same different (e.g., two instead of three). Moreover, each of MLD 110 and MLD 120 may be configured to utilize various schemes of EHT UHR dynamic multi-link switching in wireless communications in accordance with various proposed schemes, as described below. It is noteworthy that, while the various proposed schemes may be individually or separately described below, in actual implementations each of the proposed schemes may be utilized individually or separately. Alternatively, some or all of the proposed schemes may be utilized jointly.

Figure 2:
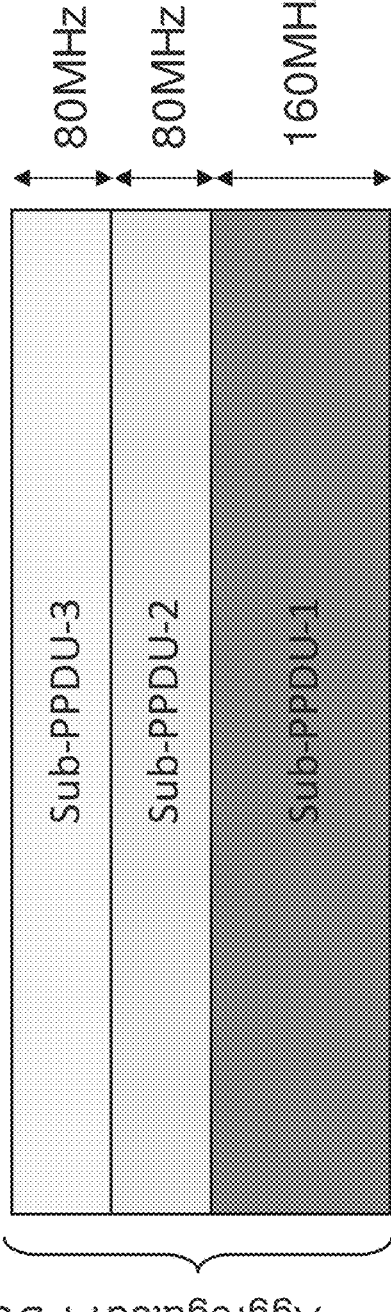
FIG. 2 is a diagram of an example scenario in accordance with an implementation of the present disclosure.

FIG. 2 illustrates an example scenario 200 in accordance with an implementation of the present disclosure. Referring to FIG. 2, an A-PPDU is comprised of multiple sub-PPDUs, with each sub-PPDU occupying respective non-overlapping frequency segment(s) and being applicable for downlink (DL) and uplink (UL) transmissions. For instance, in the example shown in FIG. 2, the A-PPDU may have three sub-PPDUs (sub-PPDU-1, sub-PPDU-2 and sub-PPDU-3), with sub-PPDU-1 occupying one 160 MHz frequency segment (or two 80 MHz frequency segments), sub-PPDU-2 occupying another 80 MHz frequency segment, and sub-PPDU-3 occupying yet another 80 MHz frequency segment. The sub-PPDUs are orthogonal in frequency domain symbol-to-symbol. The sub-PPDUs can have the same PPDU format or different PPDU formats. This may be similar to coordinated orthogonal frequency-division multiple-access (OFDMA) format using a small-bandwidth PPDU.

With respect to sub-PPDU format, each sub-PPDU may be an EHT PPDU or a high-efficiency (HE) PPDU. Accordingly, with respect to the sub-PPDUs within an A-PPDU, there may be EHT-HE aggregation, EHT-EHT aggregation or HE-HE aggregation of sub-PPDUs in the A-PPDU. EHT-HE aggregation may be useful and may achieve good throughput gain with traffic from mixed STAs. Moreover, EHT-HE aggregation may provide better support of secondary channel parking of EHT-STAs. Similar to EHT OFDMA, EHT-EHT aggregation may save some EHT signaling (EHT-SIG) overhead although with limitation of resource allocation. As for HE-HE aggregation, double or quadruple throughput may be achieved with similar overhead, and HE-HE aggregation may work well in punctured channels. However, a HE 80 MHz-operating STA parking on a secondary 80 MHz channel may have good support for punctured channels.

With respect to enabler(s) for A-PPDU, mechanisms for STAs parked on secondary channels may include, for example, subchannel selective transmission (SST) protocol enhancement and/or physical-layer (PHY) signaling for puncture information for each segment. Regarding preamble alignment across sub-PPDUs, EHT and HE are well aligned up to universal signaling (U-SIG) and/or HE-SIG-A. As for alignment of EHT-SIG and HE-SIG-B, padding may be utilized to allow the same number of symbols. HE-SIG-B may allow single-user (SU) and multi-user (MU) multiple-input-multiple-output (MIMO) transmissions in uncompressed mode. The same format may be utilized in EHT long training field (EHT-LTF) and/or HE long training field (HE-LTF), or same as data. Regarding data portion alignment, the same tone spacing may be applied across sub-PPDUs, for both EHT and HE sub-PPDUs. The same guard interval (GI) setting may also be applied.

Figure 3:
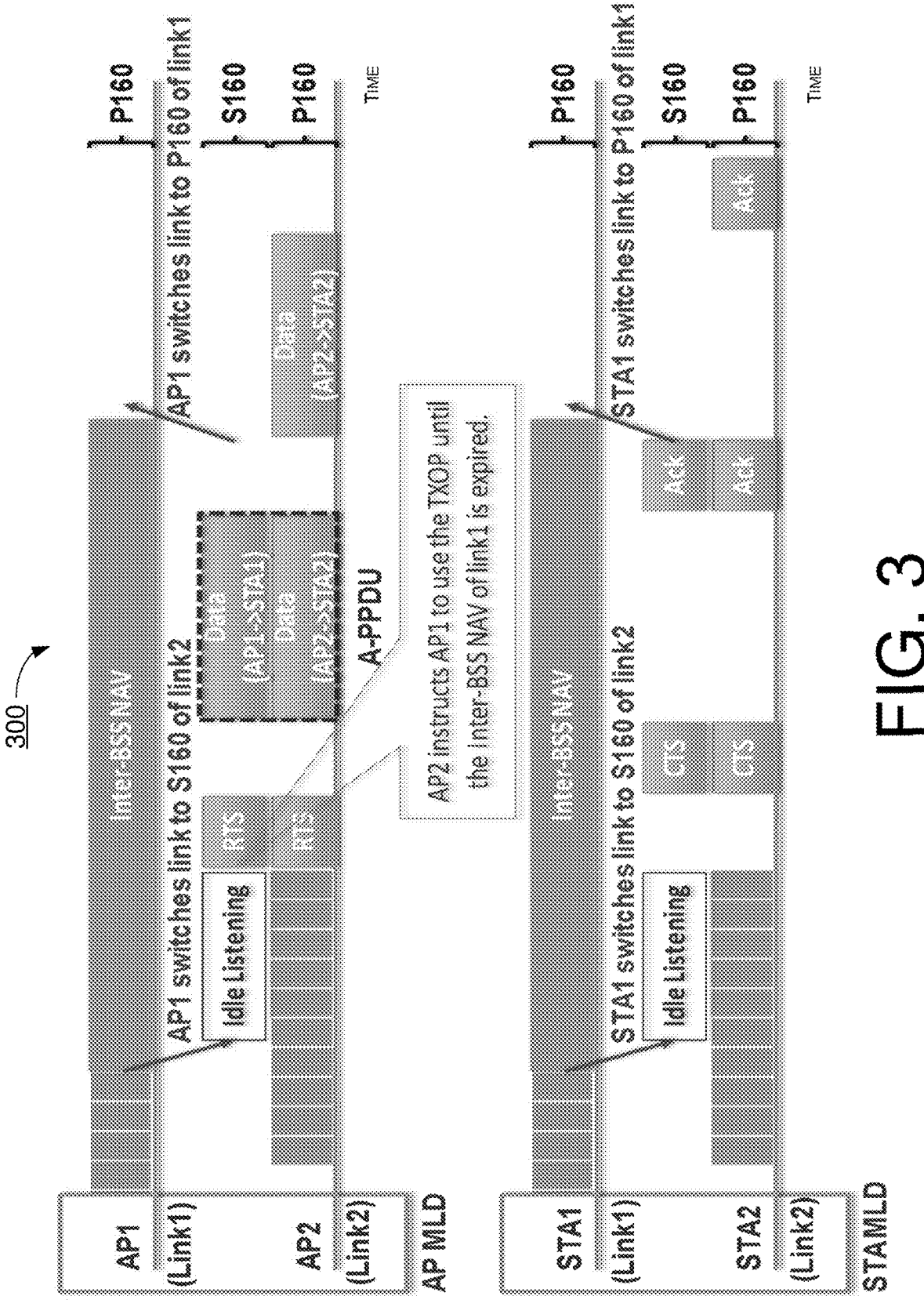
FIG. 3 is a diagram of an example scenario in accordance with an implementation of the present disclosure.

FIG. 3 illustrates an example scenario 300 of dynamic multi-link switching with A-PPDU under a proposed scheme in accordance with the present disclosure. Scenario 300 may involve a first AP (AP1) and a second AP (AP2) affiliated with the same AP MLD and operating on a first link (link1) and a second link (link2), respectively, in a multi-link operation. Scenario 300 may also involve a first STA (STA1) and a second STA (STA2) affiliated with the same STA MLD operating on link1 and link2, respectively, in the multi-link operation. Referring to FIG. 3, initially, AP1 and AP2 may each be in a backoff procedure in a primary frequency segment (e.g., primary 160 MHz or P160) on link1 and in a primary frequency segment (e.g., primary 160 MHz or P160) on link2, respectively. During the backoff procedure and detecting that P160 on link1 is busy (e.g., due to inter-BSS network allocation vector (NAV) on link1 having a non-zero value), AP1 may switch from operating on link1 to operating in a secondary frequency segment (e.g., secondary 160 MHz or S160) on link2. AP2 may obtain a TXOP upon expiry of its backoff timer, and AP2 may then allocate a secondary frequency segment to AP1. AP2 may instruct AP1 to use a transmission opportunity (TXOP) on link2 until the inter-BSS NAV of link1 is expired. Then, AP1 may transmit data to STA1 during the TXOP on link2. The TXOP may be obtained by: (a) AP1 transmitting a request-to-send (RTS) to STA1 and AP1 receiving a clear-to-send (CTS) from STA1 in S160 on link2; and (b) AP2 transmitting another RTS to a STA2 and AP2 receiving another CTS from STA2 in P160 on link2. In transmitting the data to STA1, AP1 may transmit the data as a first sub-PPDU of an A-PPDU which also includes another data transmitted to STA2 by AP2 as a second sub-PPDU of the A-PPDU. Each of STA1 and STA2 may transmit an acknowledgement (Ack) to AP1 and AP2, respectively, upon receiving respective data from AP1 and AP2, respectively. Upon expiry of a period during which link1 is busy (e.g., expiry of inter-BSS NAV on link1), AP1 may switch back to operating in P160 on link1.

Figure 4:
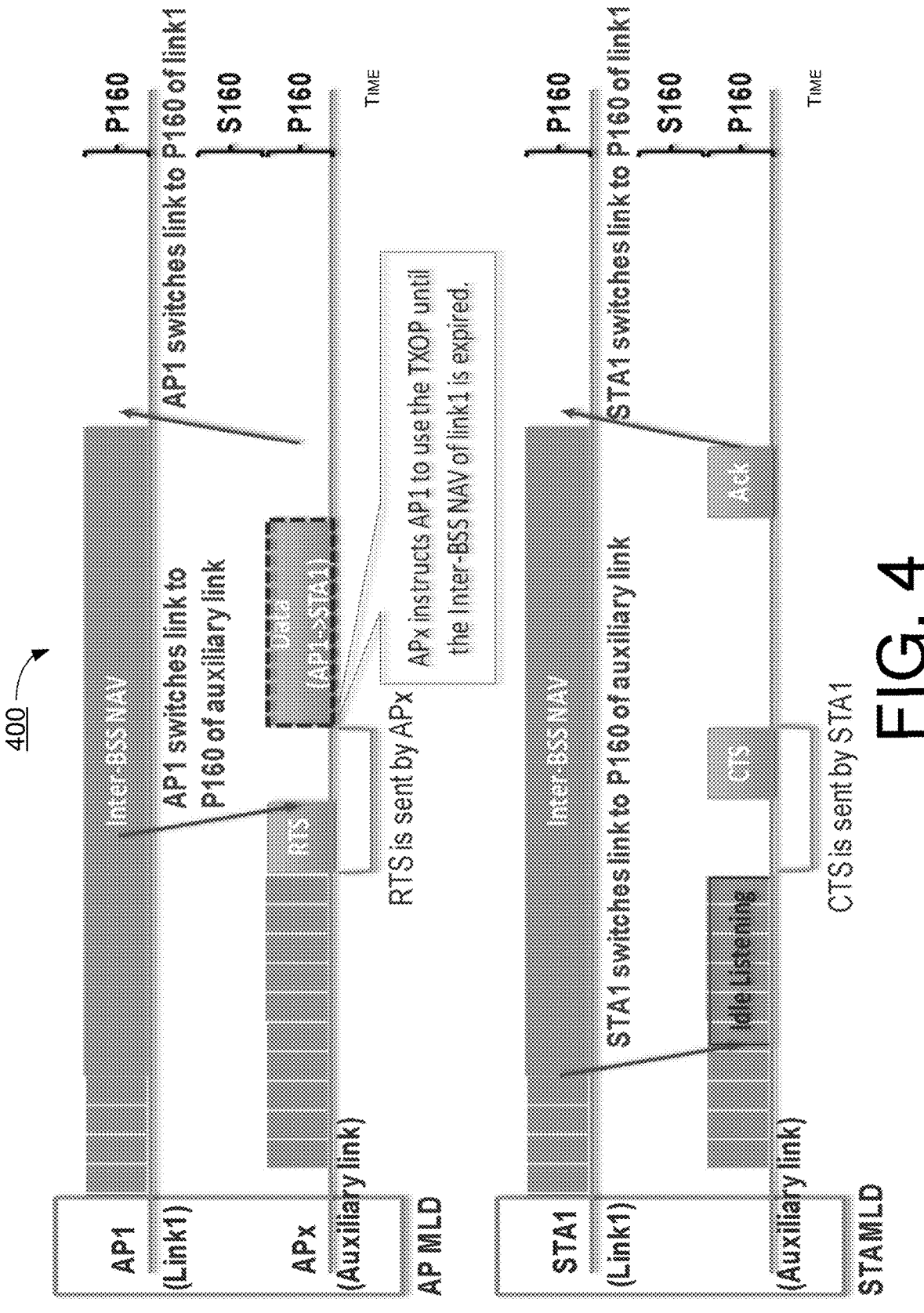
FIG. 4 is a diagram of an example scenario in accordance with an implementation of the present disclosure.

FIG. 4 illustrates an example scenario 400 of dynamic multi-link switching with auxiliary radio AP (APx) under a proposed scheme in accordance with the present disclosure. Scenario 400 may involve a first AP (AP1) and an auxiliary radio AP (APx) affiliated with the same AP MLD and operating on a first link (link1) and a second link (link2), respectively, in a multi-link operation. Scenario 400 may also involve a first STA (STA1) and a second STA (STA2) affiliated with the same STA MLD operating on link1 and link2, respectively, in the multi-link operation. Referring to FIG. 4, initially, AP1 and APx may each be in a backoff procedure in a primary frequency segment (e.g., primary 160 MHz or P160) on link1 and in a primary frequency segment (e.g., primary 160 MHz or P160) on link2, respectively. During the backoff procedure and detecting that P160 on link1 is busy (e.g., due to inter-BSS NAV on link1 having a non-zero value), AP1 may switch from operating on link1 to operating in P160 on link2. APx may obtain a TXOP upon expiry of its backoff timer, and APx may then allocate a secondary frequency segment to AP1. APx may instruct AP1 to use a TXOP on link2 until the inter-BSS NAV of link1 is expired. Then, AP1 may transmit data to STA1 during the TXOP on link2. STA1 may transmit an Ack to AP1 upon receiving the data from AP1. The TXOP may be obtained by: (a) APx transmitting a RTS to STA1 in P160 on link2; and (b) APx receiving a CTS from STA1 in P160 on link2. Upon expiry of a period during which link1 is busy (e.g., expiry of inter-BSS NAV on link1), AP1 may switch back to operating in P160 on link1.

Figure 5:
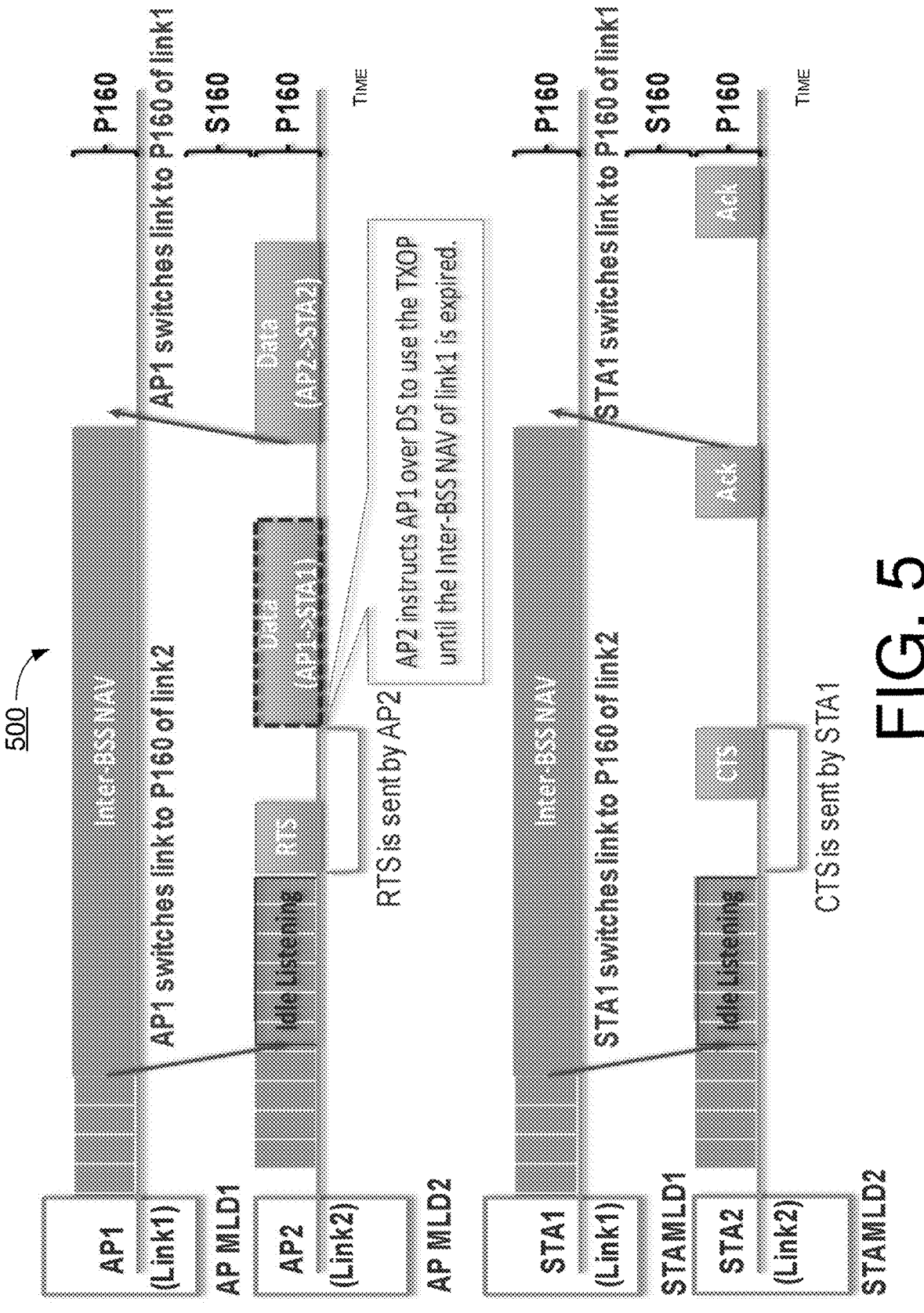
FIG. 5 is a diagram of an example scenario in accordance with an implementation of the present disclosure.

FIG. 5 illustrates an example scenario 500 of dynamic multi-link switching with TXOP sharing under a proposed scheme in accordance with the present disclosure. Scenario 500 may involve a first AP (AP1) affiliated with a first AP MLD (AP MLD1) and a second AP (AP2) affiliated with a second AP MLD (AP MLD2) and operating on a first link (link1) and a second link (link2), respectively, in a multi-link operation. AP MLD2 may be associated with an overlapping basic service set (OBSS) of AP MLD1. Scenario 500 may also involve a first STA (STA1) affiliated with a first STA MLD (STA MLD1) and a second STA (STA2) affiliated with a second STA MLD (STA MLD2) operating on link1 and link2, respectively, in the multi-link operation. Referring to FIG. 5, initially, AP1 and AP2 may each be in a backoff procedure in a primary frequency segment (e.g., primary 160 MHz or P160) on link1 and in a primary frequency segment (e.g., primary 160 MHz or P160) on link2, respectively. During the backoff procedure and detecting that P160 on link1 is busy (e.g., due to inter-BSS NAV on link1 having a non-zero value), AP1 may switch from operating on link1 to operating in P160 on link2. AP2 may obtain a TXOP upon expiry of its backoff timer, and AP2 may then allocate a secondary frequency segment to AP1. AP2 may instruct AP1 over a distribution system (DS) to use a TXOP on link2 until the inter-BSS NAV of link1 is expired. Then, AP1 may transmit data to STA1 during the TXOP on link2. STA1 may transmit an Ack to AP1 upon receiving the data from AP1. The TXOP may be obtained by: (a) AP2 transmitting a RTS to STA1 in P160 on link2; and (b) AP2 receiving a CTS from STA1 in P160 on link2. Upon expiry of a period during which link1 is busy (e.g., expiry of inter-BSS NAV on link1), AP1 may switch back to operating in P160 on link1.

Illustrative Implementations

Figure 6:
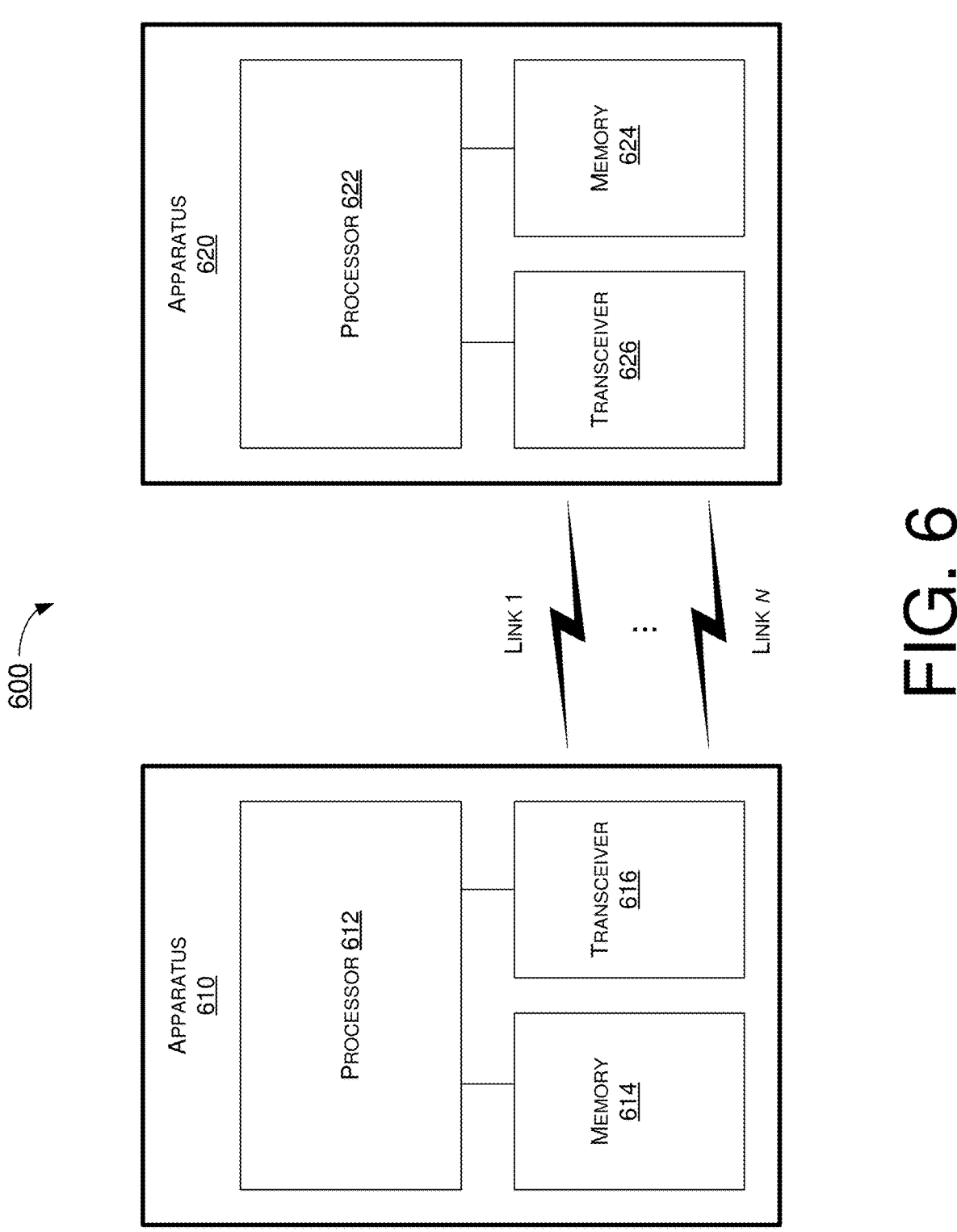
FIG. 6 is a block diagram of an example communication system in accordance with an implementation of the present disclosure.

FIG. 6 illustrates an example system 600 having at least an example apparatus 610 and an example apparatus 620 in accordance with an implementation of the present disclosure. Each of apparatus 610 and apparatus 620 may perform various functions to implement schemes, techniques, processes and methods described herein pertaining to EHT UHR dynamic multi-link switching in wireless communications, including the various schemes described above with respect to various proposed designs, concepts, schemes, systems and methods described above as well as processes described below. For instance, apparatus 610 may be an example implementation of MLD 110 or MLD 120, and apparatus 620 may be an example implementation of MLD 120.

Each of apparatus 610 and apparatus 620 may be a part of an electronic apparatus such as, for example and without limitation, a portable or mobile apparatus, a wearable apparatus, a wireless communication apparatus or a computing apparatus. For instance, each of apparatus 610 and apparatus 620 may be implemented in a smartphone, a smart watch, a personal digital assistant, a digital camera, or a computing equipment such as a tablet computer, a laptop computer or a notebook computer. Each of apparatus 610 and apparatus 620 may also be a part of a machine type apparatus, which may be an IoT apparatus such as an immobile or a stationary apparatus, a home apparatus, a wire communication apparatus or a computing apparatus. For instance, each of apparatus 610 and apparatus 620 may be implemented in a smart thermostat, a smart fridge, a smart door lock, a wireless speaker or a home control center. When implemented in or as a network apparatus, apparatus 610 and/or apparatus 620 may be implemented in a network node, such as an AP in a WLAN.

In some implementations, each of apparatus 610 and apparatus 620 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Each of apparatus 610 and apparatus 620 may include at least some of those components shown in FIG. 6 such as a processor 612 and a processor 622, respectively, for example. Each of apparatus 610 and apparatus 620 may further include one or more other components not pertinent to the proposed scheme of the present disclosure (e.g., internal power supply, display device and/or user interface device), and, thus, such component(s) of apparatus 610 and apparatus 620 are neither shown in FIG. 6 nor described below in the interest of simplicity and brevity.

In one aspect, each of processor 612 and processor 622 may be implemented in the form of one or more single-core processors, one or more multi-core processors, one or more RISC processors or one or more CISC processors. That is, even though a singular term "a processor" is used herein to refer to processor 612 and processor 622, each of processor 612 and processor 622 may include multiple processors in some implementations and a single processor in other implementations in accordance with the present disclosure. In another aspect, each of processor 612 and processor 622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 612 and processor 622 is a special-purpose machine specifically designed, arranged and configured to perform specific tasks including those pertaining to EHT UHR dynamic multi-link switching in wireless communications in accordance with various implementations of the present disclosure.

In some implementations, apparatus 610 may also include a transceiver 616 coupled to processor 612. Transceiver 616 may be capable of wirelessly transmitting and receiving data. In some implementations, apparatus 620 may also include a transceiver 626 coupled to processor 622. Transceiver 626 may include a transceiver capable of wirelessly transmitting and receiving data. Transceiver 616 of apparatus 610 and transceiver 626 of apparatus 620 may wirelessly communicate with each other over one or more of multiple links link 1~link N, with N being a positive integer greater than 1, such as a first link and a second link.

In some implementations, apparatus 610 may further include a memory 614 coupled to processor 612 and capable of being accessed by processor 612 and storing data therein. In some implementations, apparatus 620 may further include a memory 624 coupled to processor 622 and capable of being accessed by processor 622 and storing data therein. Each of memory 614 and memory 624 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 614 and memory 624 may include a type of read-only memory (ROM) such as mask ROM, programmable ROM (PROM), erasable programmable ROM (EPROM) and/or electrically erasable programmable ROM (EEPROM). Alternatively, or additionally, each of memory 614 and memory 624 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 610 and apparatus 620 may be a communication entity capable of communicating with each other using various proposed schemes in accordance with the present disclosure. For illustrative purposes and without limitation, a description of capabilities of apparatus 610, as MLD 110 or MLD 120 which may be a non-AP MLD, and apparatus 620, as MLD 120 which may be an AP MLD, is provided below in the context of example processes 700 and 800. It is noteworthy that, although the example implementations described below are provided in the context of WLAN, the same may be implemented in other types of networks.

Illustrative Processes

FIG. 7 illustrates an example process 700 in accordance with an implementation of the present disclosure. Process 700 may represent an aspect of implementing various proposed designs, concepts, schemes, systems and methods described above. More specifically, process 700 may represent an aspect of the proposed concepts and schemes pertaining to EHT UHR dynamic multi-link switching in wireless communications in accordance with the present disclosure. Process 700 may include one or more operations, actions, or functions as illustrated by one or more of blocks 710, 720 and 730. Although illustrated as discrete blocks, various blocks of process 700 may be divided into additional blocks, combined into fewer blocks, or eliminated, depending on the desired implementation. Moreover, the blocks/sub-blocks of process 700 may be executed in the order shown in FIG. 7 or, alternatively, in a different order. Furthermore, one or more of the blocks/sub-blocks of process 700 may be executed repeatedly or iteratively. Process 700 may be implemented by or in apparatus 610 and apparatus 620 as well as any variations thereof. Solely for illustrative purposes and without limiting the scope, process 700 is described below in the context of apparatus 610 as MLD 110 (e.g., a non-AP MLD) and apparatus 620 as MLD 120 (e.g., an AP MLD) of a wireless network such as a WLAN in accordance with one or more of IEEE 802.11 standards. Process 700 may begin at block 710.

At 710, process 700 may involve processor 622 of apparatus 620, as a first AP affiliated with a first AP MLD (e.g., MLD 120), switching, via transceiver 626, from operating on a first link to operating on a second link in a multi-link operation responsive to detecting the first link as busy. Process 700 may proceed from 710 to 720.

At 720, process 700 may involve processor 622 transmitting, via transceiver 626, data to a first STA affiliated with a first STA MLD (e.g., MLD 110) during a TXOP on the second link. Process 700 may proceed from 720 to 730.

At 730, process 700 may involve processor 622 switching, via transceiver 626, back to operating on the first link upon expiry of a period during which the first link is busy.

In some implementations, in switching from operating on the first link to operating on the second link, process 700 may involve processor 622 switching from operating in a primary frequency segment on the first link to operating in a secondary frequency segment on the second link. In some implementations, the TXOP may be obtained by: (a) the first AP transmitting a RTS to the first STA and the first AP receiving a CTS from the first STA in the secondary frequency segment on the second link; and (b) a second AP affiliated with the first AP MLD and operating in a primary segment on the second link transmitting another RTS to a second STA affiliated with the first STA MLD and the second AP receiving another CTS from the second STA in the primary frequency segment on the second link. In some implementations, in transmitting the data to the first STA, process 700 may involve processor 622 transmitting the data as a first sub-PPDU of an A-PPDU which also includes another data transmitted to a second STA by the second AP as a second sub-PPDU of the A-PPDU.

In some implementations, in switching from operating on the first link to operating on the second link, process 700 may involve processor 622 transmitting the data as a first sub-PPDU of an A-PPDU which also includes another switching from operating in a primary frequency segment on the first link to operating in a primary frequency segment on the second link. In some implementations, the TXOP may be obtained by an APx affiliated with the first APMLD and operating in the primary segment on the second link by: (a) the APx transmitting a RTS to the first STA in the primary frequency segment on the second link; and (b) the APx receiving a CTS from the first STA in the primary frequency segment on the second link. Alternatively, the TXOP may be obtained by a second AP affiliated with a second APMLD of an OBSS of the first AP MLD and operating in the primary segment on the second link by: (a) the second AP transmitting a RTS to the first STA in the primary frequency segment on the second link; and (b) the second AP receiving a CTS from the first STA in the primary frequency segment on the second link.

FIG. 8 illustrates an example process 800 in accordance with an implementation of the present disclosure. Process 800 may represent an aspect of implementing various proposed designs, concepts, schemes, systems and methods described above. More specifically, process 800 may represent an aspect of the proposed concepts and schemes pertaining to EHT UHR dynamic multi-link switching in wireless communications in accordance with the present disclosure. Process 800 may include one or more operations, actions, or functions as illustrated by one or more of blocks 810, 820 and 830. Although illustrated as discrete blocks, various blocks of process 800 may be divided into additional blocks, combined into fewer blocks, or eliminated, depending on the desired implementation. Moreover, the blocks/ sub-blocks of process 800 may be executed in the order shown in FIG. 8 or, alternatively in a different order. Furthermore, one or more of the blocks/sub-blocks of process 800 may be executed repeatedly or iteratively. Process 800 may be implemented by or in apparatus 610 and apparatus 620 as well as any variations thereof. Solely for illustrative purposes and without limiting the scope, process 800 is described below in the context of apparatus 610 as MLD 110 (e.g., a non-AP MLD) and apparatus 620 as MLD 120 (e.g., an AP MLD) of a wireless network such as a WLAN in accordance with one or more of IEEE 802.11 standards. Process 800 may begin at block 810.

At 810, process 800 may involve processor 612 of apparatus 610, as a first STA affiliated with a first STA MLD (e.g., MLD 110), switching, via transceiver 616, from operating on a first link to operating on a second link in a multi-link operation responsive to detecting the first link as busy. Process 800 may proceed from 810 to 820.

At 820, process 800 may involve processor 612 receiving, via transceiver 616, data from a first AP affiliated with a first AP MLD (e.g., MLD 120) during a TXOP on the second link. Process 800 may proceed from 820 to 830.

At 830, process 800 may involve processor 612 switching, via transceiver 616, back to operating on the first link upon expiry of a period during which the first link is busy.

In some implementations, in switching from operating on the first link to operating on the second link, process 800 may involve processor 612 switching from operating in a primary frequency segment on the first link to operating in a secondary frequency segment on the second link. In some implementations, the TXOP may be obtained by: (a) the first STA receiving a RTS from the first AP and the first STA transmitting CTS to the first AP in the secondary frequency segment on the second link; and (b) a second STA affiliated with the first STA MLD and operating in a primary segment on the second link receiving another RTS from a second AP affiliated with the first AP MLD and the second STA transmitting another CTS to the second AP in the primary frequency segment on the second link. In some implementations, in receiving the data from the first AP, process 800 may involve processor 612 receiving the data as a first sub-PPDU of an A-PPDU which also includes another data transmitted to a second STA by the second AP as a second sub-PPDU of the A-PPDU.

In some implementations, in switching from operating on the first link to operating on the second link, process 800 may involve processor 612 switching from operating in a primary frequency segment on the first link to operating in a primary frequency segment on the second link. In some implementations, the TXOP may be obtained by an APx affiliated with the first APMLD and operating in the primary segment on the second link by: (a) the first STA receiving a RTS from the APx in the primary frequency segment on the second link; and (b) the first STA transmitting a CTS to the APx in the primary frequency segment on the second link.

Alternatively, the TXOP may be obtained by a second AP affiliated with a second APMLD of an OBSS of the first AP MLD and operating in the primary segment on the second link by: (a) the first STA receiving a RTS from the second AP in the primary frequency segment on the second link; and (b) the first STA transmitting a CTS to the second AP in the primary frequency segment on the second link.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds 'true' for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the 'true' scope and spirit being indicated by the following claims.

What is claimed is:

1. A method, comprising:

switching, by a processor of a first access point (AP) affiliated with a first AP multi-link device (MLD), from operating on a first link to operating on a second link in a multi-link operation responsive to detecting the first link as busy;

transmitting, by the processor, data to a first station (STA) affiliated with a first STA MLD during a transmission opportunity (TXOP) on the second link; and switching, by the processor, back to operating on the first link upon expiry of a period during which the first link is busy, wherein the switching from operating on the first link to operating on the second link comprises switching from operating in a primary frequency segment on the first link to operating in a secondary frequency segment on the second link, and wherein the TXOP is obtained by:

the first AP transmitting a request-to-send (RTS) to the first STA and the first AP receiving a clear-to-send (CTS) from the first STA in the secondary frequency segment on the second link; and a second AP affiliated with the first AP MLD and operating in a primary segment on the second link transmitting another RTS to a second STA affiliated with the first STA MLD and the second AP receiving another CTS from the second STA in the primary frequency segment on the second link.

2. The method of claim 1, wherein the transmitting of the data to the first STA comprises transmitting the data as a first sub-physical-layer protocol data unit (sub-PPDU) of an aggregate physical-layer protocol data unit (A-PPDU)

which also includes another data transmitted to a second STA by the second AP as a second sub-PPDU of the A-PPDU.

3. A method, comprising:

switching, by a processor of a first station (STA) affiliated with a first STA multi-link device (MLD), from operating on a first link to operating on a second link in a multi-link operation responsive to detecting the first link as busy;

receiving, by the processor, data from a first access point (AP) affiliated with a first AP MLD during a transmission opportunity (TXOP) on the second link; and switching, by the processor, back to operating on the first link upon expiry of a period during which the first link is busy, wherein the switching from operating on the first link to operating on the second link comprises switching from operating in a primary frequency segment on the first link to operating in a secondary frequency segment on the second link, and wherein the TXOP is obtained by:

the first STA receiving a request-to-send (RTS) from the first AP and the first STA transmitting a clear-to-send (CTS) to the first AP in the secondary frequency segment on the second link; and a second STA affiliated with the first STA MLD and operating in a primary segment on the second link receiving another RTS from a second AP affiliated with the first AP MLD and the second STA transmitting another CTS to the second AP in the primary frequency segment on the second link.

4. The method of claim 3, wherein the receiving of the data from the first AP comprises receiving the data as a first sub-physical-layer protocol data unit (sub-PPDU) of an aggregate physical-layer protocol data unit (A-PPDU) which also includes another data transmitted to a second STA by the second AP as a second sub-PPDU of the A-PPDU.

5. An apparatus, comprising:

a transceiver configured to communicate wirelessly; and a processor coupled to the transceiver and configured to perform, as a first access point (AP) affiliated with a first AP multi-link device (MLD), operations comprising:

switching, via the transceiver, from operating on a first link to operating on a second link in a multi-link operation responsive to detecting the first link as busy;

transmitting, via the transceiver, data to a first station (STA) affiliated with a first STA MLD during a transmission opportunity (TXOP) on the second link; and switching, via the transceiver, back to operating on the first link upon expiry of a period during which the first link is busy, wherein the switching from operating on the first link to operating on the second link comprises switching from operating in a primary frequency segment on the first link to operating in a primary frequency segment on the second link, and wherein the TXOP is obtained by an auxiliary radio AP (APx) affiliated with the first APMLD and operating in the primary segment on the second link by:

the APx transmitting a request-to-send (RTS) to the first STA in the primary frequency segment on the second link; and the APx receiving a clear-to-send (CTS) from the first
STA in the primary frequency segment on the second
link.

\* \* \* \* \*